Oct. 10, 1967  AKIYOSHI WADA  3,345,907
DICHROISM SPECTROSCOPES
Filed June 17, 1963  3 Sheets-Sheet 1
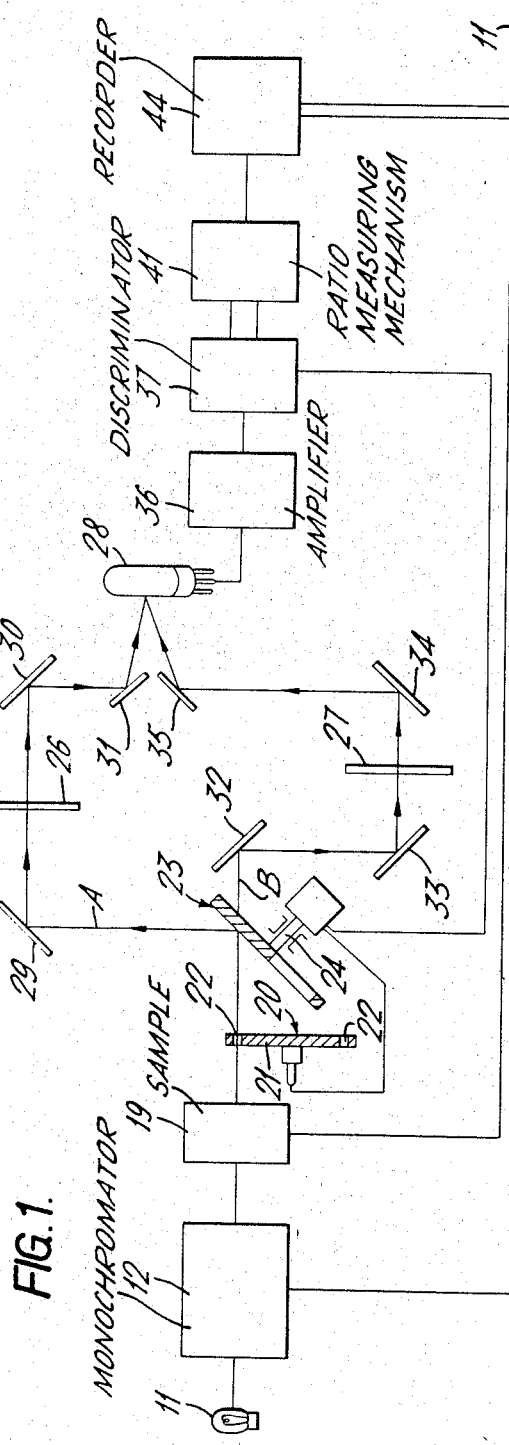
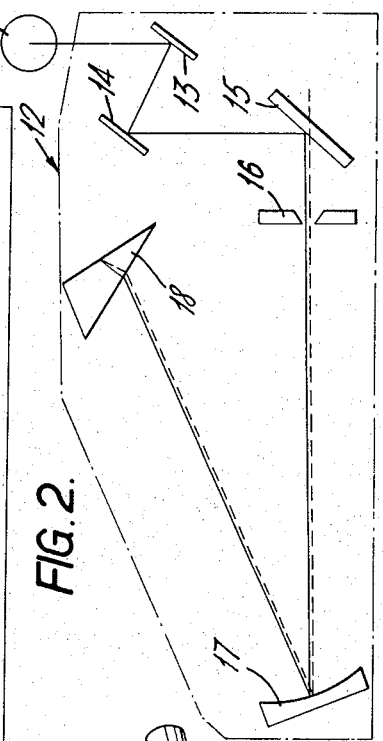
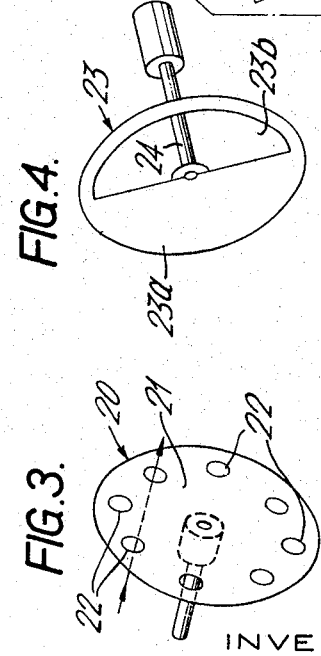
INVENTOR
AKIYOSHI WADA
BY
Morgan, Finnegan, Durham & Pine
ATTORNEYS

United States Patent Office 3,345,907
Patented Oct. 10, 1967

3,345,907
DICHROISM SPECTROSCOPES
Akiyoshi Wada, 66 Shinsaka-cho, Akasaka, Minato-ku,
Tokyo, Japan
Filed June 17, 1963, Ser. No. 288,403
1 Claim. (Cl. 88—14)

This invention relates to improvements in dichroism spectroscopes which are used for polarization analysis of dichroic materials and more particularly to dichroism spectroscopes in which the dichroic intensity of dichroic materials is directly and automatically indicated.

As we show in discussing dichroic crystals, such materials exhibit a different degree of absorption for vibrations in two mutually perpendicular directions, showing two different colours. This property is called the "dichroism" of the substance. Dichroism is also seen with respect to certain liquid materials when a laminar flow is produced. Heretofore, the measurement of the dichroic intensity of a dichroic material has been carried out by measuring individual degrees of light absorption in two mutually perpendicular directions through the utilization of a polarization technique and then comparing said two different degrees of light absorption.

The primary object of the invention is to provide a dichroism spectroscope of novel and improved type in which the dichroic intensity of a dichroic material can be measured automatically and in a single operation and directly indicated.

Another object is to provide an improved optical system for a dichroism spectroscope which is simple in construction and operation, superior in accuracy of measurement, and economical to manufacture.

A further object is to provide an optical system for a dichroism spectroscope which is capable of rapid measurement of the dichroic intensity of a sample at a number of wavelengths, and the recording of this measurement.

The optical system of the invention includes means for polarizing the light passing through a dichroic sample alternately in two particular directions perpendicular to each other. In these two particular directions, the sample exhibits the maximum dichroic intensity. As a result of the utilzation of the above means, two output signals of different magnitudes will be alternately produced at the photocell at one end of the optical path. The dichroic intensity may be indicated by measuring these two different outputs in the ratio of one to the other.

Other object and advantage of the invention will become apparent from the detailed description which follows when taken in conjunction with the accompanying drawings which:

FIG. 1 is a schematic view showing the optical system of the device of the invention;

FIG. 2 is a schematic view of a monochromator which may be used in the device of the invention;

FIG. 3 is a diagrammatic perspective view of the chopper which may be included in the device illustrated in FIG. 1;

FIG. 4 is a diagrammatic perspective view of means for distributing the light into two different paths which is included in the device illustrated in FIG. 1;

Figure 5:
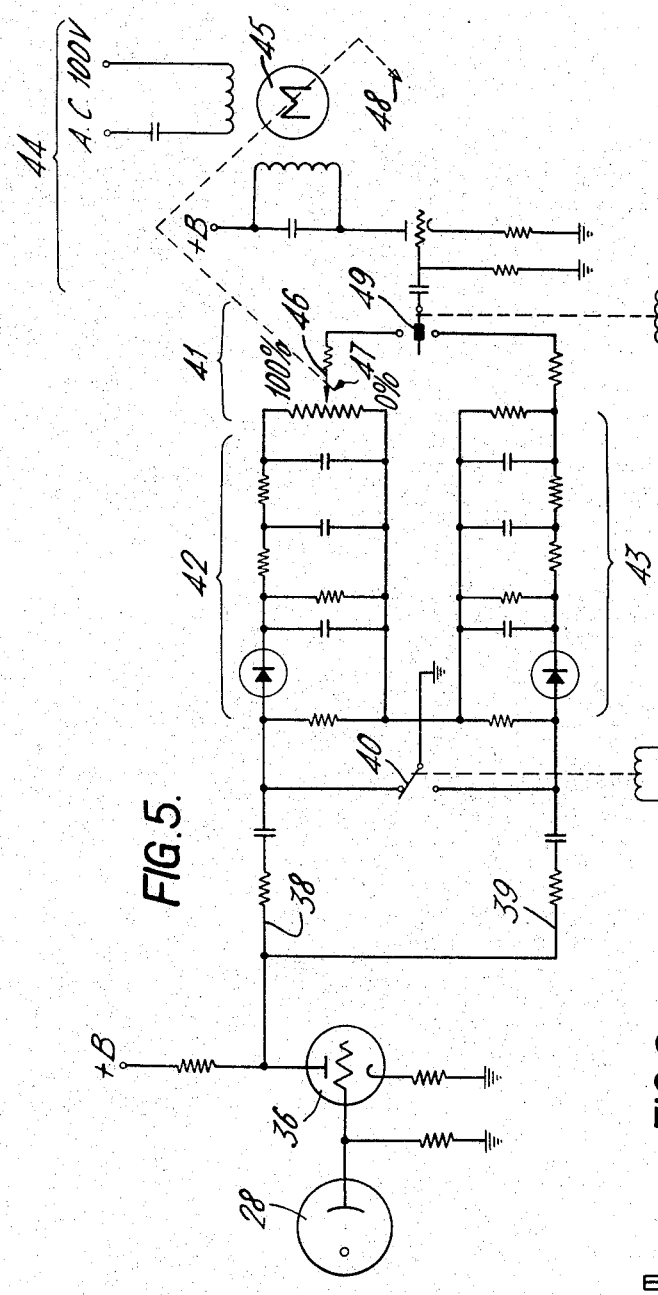
FIG. 5 is a wiring diagram of the electric circuit from the photocell to the recorder which may be included in the device illustrated in FIG. 1.

Referring more particularly to the drawings wherein like characters of reference designate like parts throughout the several views, the basic system of the device of the invention is illustrated in FIG. 1. A light source 11 at one end of the optical path illuminates the system with one selected wavelength at a time through a monochromator generally indicated as 12. The monochromator 12 may be of any known type which comprises, for eample, a condensing mirror 13, FIGURE 2 reflectors 14 and 15, an inlet and outlet slit 16, collimator 17 and a crystal prism 18, as shown in FIG. 2. The light is changed by the prism 18 into a spectrum having a single wavelength. As the prism 18 is gradually turned about its pivotal axis, different wavelengths will be successively produced. If the light source 11 is monochromatic by itself or with any other means such as a filter which allows only a selected single wavelength to pass therethrough, the monochromator 12 is not included in the system. The light leaving the monochromator 12 passes through a sample 19 to be studied which may be a dichroic crystal. The dichroism is also seen with respect to some particular liquid materials when a laminar flow is produced. The device of the invention may also be used for chemical analysis of such liquid materials like these. In this case, the liquid sample to be studied may be contained in a particular cell which is provided with a suitable means for producing a laminar flow of the liquid sample, for example, as shown in my co-pending U.S. patent application Serial No. 274,286.

The light leaving the sample 19 may be changed by a chopper 20 into an intermittent light. The chopper 20 may comprise a revolving circular plate 21 with a number of round holes 22 arranged in a circle along its periphery, as shown more in detail in FIG. 3. The chopper 20 is revolved at a high speed by a suitable drive means such as a motor. If the chopper 20 with eight round holes 22 is rotated at the speed of 900 r.p.m., the light from the source 11 will be intermitted at the rate of 120 pulses per second.

According to the invention, the light passing through the sample is then polarized alternately in two particular directions perpendicular to each other, in which the sample exhibits the maximum dichroic intensity. The light polarizing means for this purpose is illustrated, by way of example, in FIG. 1. The optical system illustrated in FIG. 1 includes means for distributing the intermittent light leaving the chopper 20 into two different paths. This means may be a revolving reflector generally indicated as 23. As shown in greater detail in FIG. 4, the reflector 23 comprises a mirror plate consisting of a semicircular body part 23a and a semicircular perforated blank part 23b. The reflector 23 is rotatably carried at its central axis 24. 25 is a motor for driving the reflector 23. The mirror plate is arranged obliquely to the optical path and in such a manner that the optical axis may not pass through the center of the plate 23. If the reflector 23 is driven in rotation about its central axis 24 by the motor, the intermittent light leaving the chopper 20 will be reflected by the body part 23a in the direction of A in its first half turn, while it will go straight on through the blanked part 23b toward in its second half turn. Continuous rotations of the reflector 23, therefore, distribute the light alternately into two different paths A and B. The reflector 23 is preferably synchronized with the chopper 20. This may be accomplished by driving the reflector 23 and chopper 20 by the same motor 25. For the discrimination purpose which will be described hereinafter, it is advisable to select the intermittent speed of the chopper 20 to be equal to or an integral multiple of the rotary speed of the reflector 23. For example, the reflector 23 may be rotated at the same speed as that of the chopper 20.

In both optical paths of A and B are arranged polarizers 26 and 27, respectively, which may be formed of a sheet of light polarizing material which is conventional in polarimeters. The light passing through the polarizers 26 or 27 reaches a photoelectric cell 28 at the opposite end of the optical system where it is converted into an electrical signal. The reflectors included in both paths A and B toward the photoelectric cell 28 are indicated with the numerals 29, 30, 31 and 32, 33, 34, 35, respectively.

Figure 6A:
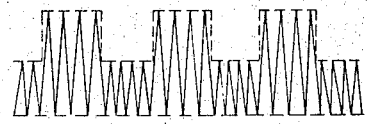
FIGS. 6a to 6e are wave form diagrams showing the various signals in different stages of the device illustrated in FIG. 1.

The two polarizers 26 and 27 are so arranged that the respective planes of polarization are perpendicular to each other and parallel to the two axes in which the dichroic sample to be studied exhibits the maximum dichroic intensity. As a result, the two lights leaving the respective polarizers 26 and 27 with different intensities alternately enter into the photoelectric cell 28 to produce alternately two kinds of output signals of different amplitudes, as shown in FIG. 6a. For instance, the larger amplitude is the output signal produced by the light passing through one polarizer 26, while the smaller amplitude is one produced by the light passing through the other polarizer 27.

According to the invention, these two different output signals are compared and measured in the form of the ratio of one to the other which indicates the dichroic intensity of the sample. This may be accomplished by a device comprising in combination an amplifier 36, a discriminator 37, a ratio measuring mechanism 41 and a recorder 44. An embodiment of the device is illustrated by way of example in FIG. 5.

Figure 6B:
Figure 6D:
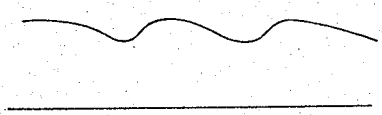
Figure 6C:
Figure 6E:
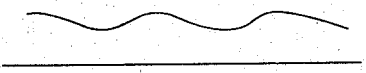

The output signal of the photoelectric cell 28 is, after being amplified by an amplifier 36, separated by a discriminator 37 into two individual signals: the larger amplitude as shown in FIG. 6b and the smaller amplitude as shown in FIG. 6c. The discrimination may be easily accomplished by connecting alternately the parallel circuits 38 and 39 led from the amplifier 36 with a switch 40 in a synchronous relation with the distributing operation of the distributing reflector 23. The separated, individual signals are preferably rectified and smoothed by the rectifying and smoothing circuits 42 and 43, respectively, in the forms as shown in FIGS. 6d and 6e. The two outputs from the rectifying and smoothing circuits 42 and 43 are compared with each other by a ratio measuring mechanism 41 to produce an output corresponding to the ratio of the output from the circuit 42 to the output from the circuit 43. The ratio measuring mechanism 41 may comprise an adjustable voltage divider 47 having a travelling contact 46 as shown in FIG. 5. The output from the ratio measuring mechanism 41 is changed by a DC-AC converter 49 into an alternating current which may have a commercial frequency of 50 or 60 c.p.s. and then applied to a servomotor 45. The servomotor 45 is driven by the difference between the output from the ratio measuring mechanism 41 and a constant voltage, for example A.C. 100 v. The servomotor operates to adjust the travelling contact 46 of the adjustable voltage divider 47 until it finds a balance position and at the same time drives a pen 48 on the recording paper (not shown). In this manner, the dichroic intensity of the sample can be measured and recorded with respect to a selected wavelength. If the recording paper is fed in interconnection with the spectral scanning operation in the monochromator 12, a wavelength-dichroic intensity diagram will be drawn on the recording paper. On the other hand, if the dichroic sample 19 is rotated about the optical axis and the recording paper is fed in interconnection with the rotation of the sample, the recorder will record the change in the dichroic intensity of the sample due to the variation of directions in which said sample is observed.

In the above, it is not essential to use the chopper 20. When it is not used, the output signal at the photoelectric cell 28 will be a rectangular wave. However, the use of a chopper is advantageous in that the amplification of the output signal can be easily carried out through the utilization of an alternative amplifier.

Figure 7:
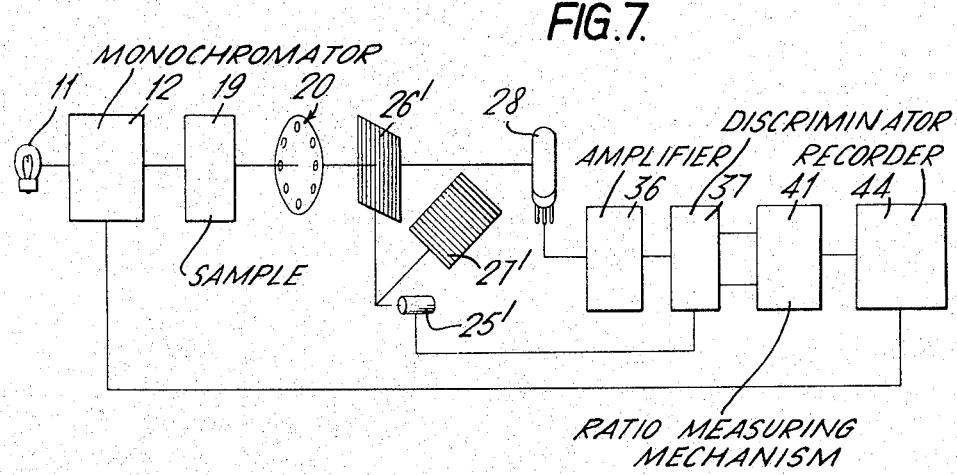
FIG. 7 is a schematic view of a modification of the device of the invention.

A similar effect can be obtained by alternately inserting a pair of polarizers having different planes of polarization perpendicular to each other in a single optical path. This system is schematically illustrated in FIG. 7. In this system, two kinds of output signals are produced at the photoelectric cell 28 as well as in the system illustrated in FIG. 1. The two different signals may be measured in the form of the ratio of one to the other to indicate the dichroic intensity in a similar manner to that described hereinbefore with respect to the system illustrated in FIG. 1. It will be understood that the discriminator 37 be synchronized with the drive means 25' for alternately inserting the two polarizers 26' and 27' in the single optical path. The drive means 25' may be of a reversible type.

Figure 9:
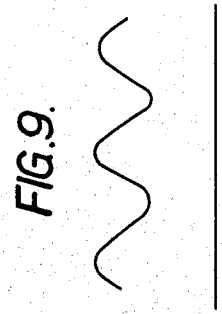
FIG. 9 is a wave form diagram of the output signal which may be obtained with the light polarizing means illustrated in FIG. 8.
Figure 8:
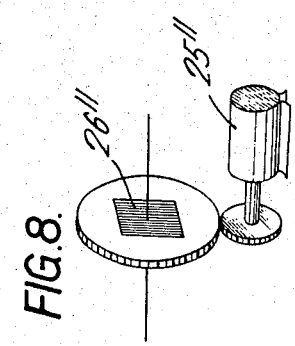
FIG. 8 is a diagrammatic perspective view of a modified form of light polarizing means which may be incorporated in the device of the invention.

Another modification of the invention is to utilize a signal rotatable polarizer 26'' as shown in FIG. 8. The polarizer 26'' may be substituted for the two polarizers 26' and 27' illustrated in FIG. 7. During a rotation of the single polarizer 26'' about the optical path, its plane of polarization varies continuously in the various directions including two mutually perpendicular directions in which a dichroic sample exhibits the maximum dichroic intensity. Continuous revolutions of the polarizer 26'' at a high speed, which may be provided by gearing from a motor 25'', will produce a continuous output signal of a sine curve form, as shown in FIG. 9, at the photoelectric cell at the end of the optical path. The dichroic intensity of the sample may be indicated by measuring the ratio of the maximum magnitude of the output signal to the minimum magnitude of the same.

From the foregoing, it can be seen that simple, efficient and economical means have been provided for accomplishing all of the objects and advantage of the invention. Nevertheless, it is apparent that many changes in the details of construction, and arrangement of parts of the invention are permissible as expressed in the accompanying claim and the invention is not limited to the exact matters shown and described as only the preferred matters have been given by way of illustration.

What I claim is:

A dichroism spectroscope along a straight line optical path comprising a monochromatic light source at one end of said optical path, photoelectric light receiving means at the opposite end of said optical path adapted to convert light into electrical signals representing variable intensity and variable polarization a sample cell, a linear polarizer in said optical path intermediate said sample cell and said light receiving means, means for continuously rotating said polarizer about the optical axis coincident with said optical path so that the plane of polarization varies continuously in directions including two mutually perpendicular directions in which a dichroic sample exhibits the maximum dichroic intensity, and means coupled to said light receiving means for measuring the ratio of the output of said photoelectric light receiving means by comparing the intensities of the polarized light in one of said two directions to that according to the polarized light in the other direction.

(References on following page)

References Cited

UNITED STATES PATENTS

| | | | |
|---|---|---|---|
| 2,680,989 | 6/1954 | Savitzky et al. | 88—14 |
| 2,861,493 | 11/1958 | Landegren | 88—14 |
| 2,879,393 | 3/1959 | Cary et al. | 88—14 |
| 3,151,204 | 9/1964 | Stacy | 88—14 |
| 3,257,894 | 6/1966 | Grosjean | 88—14 |

JEWELL H. PEDERSEN, *Primary Examiner.*

B. J. LACOMIS, *Assistant Examiner.*